United States Patent Office 2,856,451
Patented Oct. 14, 1958

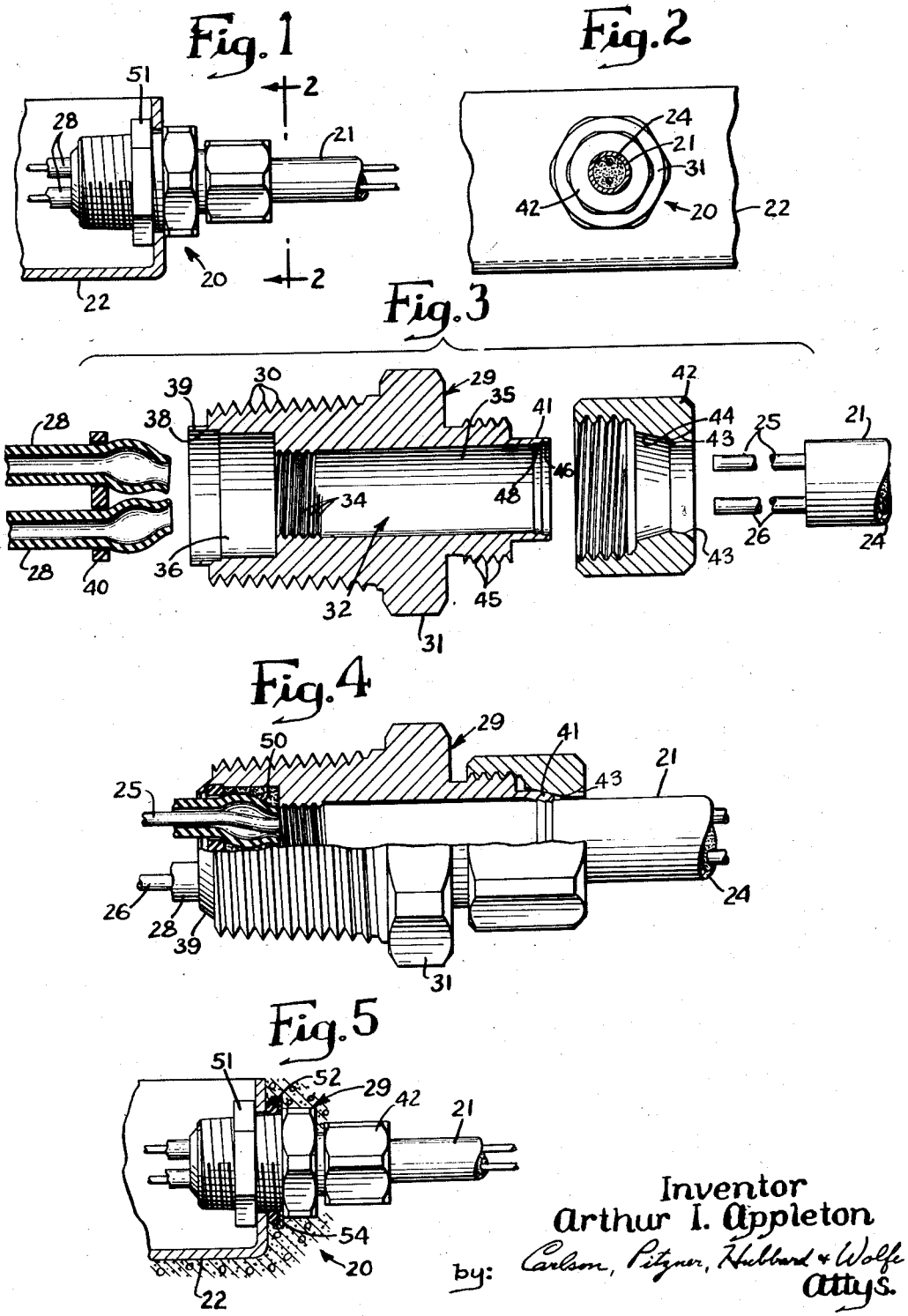
Oct. 14, 1958  A. I. APPLETON  2,856,451
FITTING HAVING COMPOUND COUPLING MEANS FOR USE
WITH MINERAL INSULATED SHEATHED CABLE
Filed July 29, 1954  2 Sheets-Sheet 1
Inventor
Arthur I. Appleton
by: Carlson, Pitzner, Hubbard & Wolfe
attys.

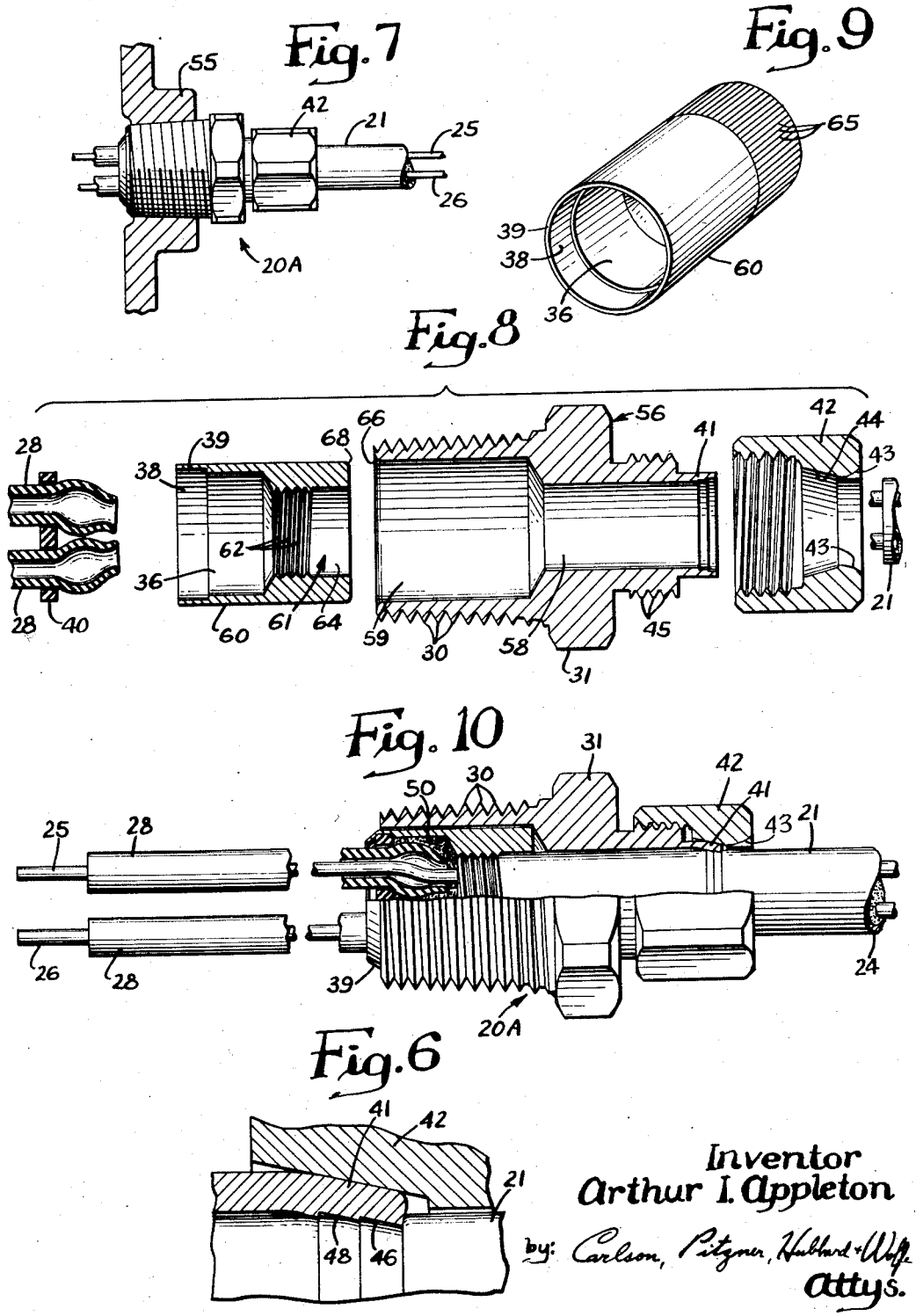

2,856,451

FITTING HAVING COMPOUND COUPLING MEANS FOR USE WITH MINERAL INSULATED SHEATHED CABLE

Arthur I. Appleton, Northbrook, Ill.

Application July 29, 1954, Serial No. 446,475

3 Claims. (Cl. 174—77)

The present invention relates in general to fittings for electric cable or conduit systems and, more specifically, to certain novel fittings finding particular, although not exclusive, utility when applied to mineral insulated sheathed cable. This application is a continuation-in-part of the present inventor's earlier application Serial No. 394,652, filed November 27, 1953, and now abandoned.

The expression "mineral insulated sheathed cable," as used herein, connotes a type of electric cable or conduit comprising a seamless tubular metallic sheath which houses one or more conductors, the latter being maintained in insulated relation to each other and to the sheath by an inert mineral substance such as powdered magnesium oxide. This type of cable possesses many highly advantageous qualities, such as resistance to moisture and various fluids, high resistance to heat and to extremes of temperature, compactness with extremely high current carrying capacity, and mechanical flexibility. Largely because of these qualities, mineral insulated cable is often used in installations where it is subjected to moisture, fluids, or the weather. To adapt it for such installations, it is necessary that the fittings applied to the ends of the cable be fluidtight.

One object of the invention is to provide a fluidtight fitting for mineral insulated sheathed cable which will be of simple, rugged construction and capable of being easily installed even by unskilled personnel.

Another object is to provide a fitting of the character set forth which will adapt the cable for connection to ordinary boxes and fittings commonly used in conventional wiring systems such as those found in industrial and office buildings, stores and homes.

Still another object is the provision of such a fitting for mineral insulated cable which permits bending or smooth curving of the cable at the point of its connection with the fitting, and with no danger of flaring, cutting, or kinking the cable's metallic sheath.

A further object is to provide a fluidtight fitting of the type just outlined and which will be susceptible of economical manufacture on a mass productive basis by means such as automatic screw machines.

Other objects and advantages will become apparent as the following description proceeds, taken in connection with the accompanying drawings, wherein:

Figure 1 is a side elevational view of one form of fitting illustratively embodying the invention, such fitting being installed in the knock-out aperture of a junction box.

Fig. 2 is an end view of the illustrative fitting taken in the plane of the line 2—2 in Fig. 1.

Fig. 3 is an enlarged, exploded longitudinal sectional view detailing the illustrative fitting of Fig. 1 and the cable and insulating devices associated therewith.

Fig. 4 is a view similar to Fig. 3 but showing the fitting, cable, and insulating elements all in assembled relation.

Fig. 5 is a view similar to Fig. 1 but showing an external sealing element between the fitting and the outer face of the box wall.

Fig. 6 is a further enlarged, fragmentary sectional view detailing the manner in which the illustrative fitting sealingly engages the sheath of the cable.

Fig. 7 is a side elevational view of another form of fitting also illustratively embodying the invention, such fitting being mounted in the internally threaded hub of an electrical box or fixture.

Fig. 8 is an enlarged, exploded longitudinal sectional view detailing the illustrative fitting of Fig. 7 and the cable and insulating devices associated therewith.

Fig. 9 is an enlarged perspective view showing one of the component elements of the fitting of Figs. 7 and 8.

Fig. 10 is a view similar to Fig. 8 but showing the parts in assembled relation on the cable.

While the invention is susceptible of various modifications and alternative constructions, certain illustrative embodiments have been shown in the drawings and will be described below in considerable detail. It should be understood, however, that there is no intention to limit the invention to the specific forms disclosed, but, on the contrary, the intention is to cover all modifications, alternative constructions and equivalents falling within the spirit and scope of the invention as expressed in the appended claims.

Referring more particularly to Figs. 1 through 6, the invention is there shown embodied in an illustrative fitting 20 applied to a mineral insulated sheathed cable 21. The fitting 20 is mounted in the knock-out aperture of a junction, switch, or outlet box 22 and serves as a connector bringing the end of the cable 21 into the box 22. To accommodate the cable 21 for application of the fitting 20, the last few inches of the tubular sheath 24 and the mineral insulation associated therewith are first removed, exposing the bare end portions of the conductors 25, 26. The latter are then protected by means of insulator sleeves 28.

The fitting 20 comprises, in general, a hollow body 29 having external mounting threads 30 and a tool engaging portion 31 which in this case happens to be of hexagonal form. Integral with the body 29 and situated adjacent opposite ends thereof are sealing means for effecting a fluidtight seal between the fitting body and the exterior of the cable sheath, on the one hand, and between the body and the mineral filled interior of the sheath, on the other hand.

For the purpose of receiving the end of the cable sheath 24 remaining after stripping away of the last few inches, the fitting body 29 is formed with a longitudinal cable-receiving passage 32. Adjacent the innermost end of the latter, there are a plurality of self-cutting threads 34 which are of slightly smaller internal diameter and which are thus adapted to screw onto the cable sheath 24 upon rotation of the fitting body in the proper direction. The unthreaded portion 35 of the passage 32 is of slightly larger diameter than the cable sheath 24 and telescopically receives the sheath 24 without excessive clearance. Thus the unthreaded portion 35 of the passage 32, particularly the region immediately adjacent the threads 34, serves as a most effective means for guiding the end portion of cable sheath 24 into coaxial threaded engagement with the self-cutting threads 34. When engaged with the cable sheath, the threads 34 afford not only a good mechanical anchorage for the same, but, in addition, provide a highly satisfactory electrical connection which amply assures the ground continuity of the wiring system.

For the purpose of effecting a seal between the fitting body 29 and the interior of the cable 21, the body 29 is provided with a sealing well 36 at its innermost end (left-hand end as viewed in Figs. 3 and 4). The sealing well 36 is adapted to receive a quantity of sealing compound in the form of an insulating paste. The outer end of the sealing well 36 is formed with a recess 38 and a surrounding retainer skirt 39. The recess 38 is adapted to receive the sealing well cap 40 and the retainer skirt 39 is so proportioned that it may be rolled over or otherwise deformed in a radial inward direction so as to hold the disk 40 in the recess 38. The disk 40 is arranged to anchor the protective insulator sleeves 28 for the exposed conductors 25, 26, the sleeves 28 having enlarged bulbous ends which project into the sealing well 36 when the fitting is assembled as shown in Fig. 4.

Provision is made in the fitting body 29 for creating a fluidtight seal between the body and the exterior of the cable sheath 24. This is accomplished by the use of a deformable sealing skirt 41 integral with the fitting body 29 and situated adjacent the outermost end thereof (right-hand end as viewed in Figs. 3 and 4). The skirt 41 is adapted to be squeezed radially inward into biting relation with the outer periphery of the cable sheath 24. This is done by the use of a sealing nut 42 having a heavy, axially tapering shoulder 44. The latter is adapted to receive the free end of the skirt 41 and to exert a progressively increasing radial inward squeeze on the same as the nut 42 is drawn up on threads 45 which are situated on the fitting body between the skirt 41 and the tool receiving portion 31. In order to facilitate orderly deformation of the skirt 41 and to enhance its biting action on the cable sheath 24, the skirt 41 may be formed with one or more counterbores 46, 48. When a plurality of such counterbores are used, their diameters are selected to provide steps in the internal peripheral wall of the skirt 41 with the result that the wall thickness of the skirt 41 decreases toward the outer end of the body. When the skirt 41 becomes fully deformed, as indicated in Figs. 4 and 6, it will be noted that the sharp edges of the counterbores 46, 48 effectively serve as teeth defining a plurality of unbroken annular bites on the outer periphery of the cable sheath 24.

In keeping with an important aspect of the invention, that part of the fitting from which the cable extends after all the elements are assembled is formed in a manner to permit the cable to be curved or bent at the region of its emergence from the fitting without any attendant tearing or cutting of the cable sheath. In accomplishing this, the mouth from which the cable sheath extends is smoothly chamfered or flared to form in effect a "bell mouth." As shown in the embodiment of Figs. 1–5, the right end of the passage through the nut 42 is smoothly flared outwardly as at 43 to form the bell mouth. It has been found, for example, that where the inside diameter of the nut 42 just to the right of the tapered shoulder 44 is about .344 inch, a flaring radius of .75 inch for the bell mouth 43 provides the advantages contemplated. If the cable sheath 24 were bent at its end prior to its connection to the fitting the assembly would be more difficult. With the present construction, however, after the fitting is assembled, as in Fig. 4, the cable 21 may be bent or angled to connect with other electrical components located laterally of the fitting axis, the bell mouth 43 creating a smooth curvature of the sheath 24 and preventing either cutting of the sheath on a sharp edge of the nut or tearing of the sheath as a result of its being angled too sharply.

To install the fitting 20 on the cable 21, the first step is to remove the last few inches of the sheath 24 as mentioned earlier herein, taking care to avoid raggedness or burrs on the end of the sheath 24 which remains. The sealing nut 42, and then the fitting body 29, are slipped over the exposed conductors 25, 26 and the remaining end portion of the cable sheath 24. The latter enters the body passage 32 and ultimately encounters the threads 34. The unthreaded portion 35 of the passage 32 guides the cable sheath and the fitting body so as to insure proper starting of the threads 34 for coaxial threaded engagement with the end of the sheath 24. Such threaded engagement is brought about by holding the cable sheath 24 and turning or screwing the fitting body 29 in the proper direction until the end of the sheath 24 is approximately flush with the bottom of the sealing well 36, as shown in Fig. 4. Suitable means such as a quantity of insulating sealing compound or paste 50 is then placed in the sealing well 36 and the insulator assembly is slipped over the exposed ends of the conductors 25, 26 and pushed toward the fitting body until the sealing well cap 40 bottoms in the recess 38. At that point, the retainer skirt 39 is subjected to radial deformation so as to hold the cap 40 snugly within the recess 38. The seal between the body and the outer periphery of the cable sheath 24 may thereupon be completed by tightening the sealing nut 42 on the threads 45 until the parts assume the relation indicated in Figs. 4 and 6.

After the fitting 20 has been attached to the cable 21 in the manner just set forth, the installation may be completed by thrusting the inner end of the fitting through the knock-out aperture of the box 22 and applying the lock nut 51. The latter simply draws the tool engaging portion 31 of the fitting snugly against the outer face of the box wall. In instances where the wiring installation is to be embedded in a slab of poured concrete, it is desirable to insert a seal between the fitting body 29 and the wall of the box 22. An illustrative seal of this character is shown in Fig. 5 and comprises a resilient O ring 52 and a bearing washer 54.

Turning now to Figs. 7 through 10, there is shown another form of fitting 20A which also exemplifies the invention. The fitting 20A finds particular utility in installations such as the one shown in Fig. 7 where the fitting is mounted by threading the body into the tapped hole of a box or fixture hub 55. Such an installation makes it highly desirable to avoid direct threaded engagement between the fitting body and the cable sheath. The fitting 20A is designed to fulfill that objective but in other respects it is similar to the fitting 20. In the following description, like reference characters will be applied to parts common to both fittings.

The fitting 20A has a body 56 generally similar to the body 29 of the fitting 20 in that it is provided with mounting threads 30, a tool engaging portion 31, a sealing skirt 41 for effecting a seal between the body 56 and the outer periphery of the cable sheath 24, and threads 45 for receiving the sealing nut 42 associated with the skirt 41. However, the body 56 has no threaded connection with the cable sheath 24, being provided with a smooth cable receiving passageway 58 freely slidable along the cable 21.

Housed within a relatively large, counterbored recess 59 communicating with the passage 58 is a sealing head 60 (Figs. 8, 9 and 10). The latter is proportioned to slide easily into or out of the recess 59 and is formed with a sealing well 36, cap recess 38, and retainer skirt 39 similar to those associated with the sealing well 36 of the fitting 20. Communicating with the sealing well 36 and situated in the sealing head 60 is a cable-receiving passage 61. Adjacent the well 36, the passage 61 has a plurality of self-cutting threads 62 for entering into threaded engagement with the cable sheath after the manner of the threads 34 of the fitting 20. The passage 61 has an unthreaded portion 64 situated between the self-cutting threads 62 and the bottom or inner end of the sealing head 60. The unthreaded portion 64 is proportioned to make a telescopic fit with the end of cable sheath 24 and thereby to guide the threads 62 into coaxial threaded engagement with the cable sheath. To facilitate turning of the sealing head 60 during this threading operation, the head 60 may be formed with knurling 65 on its outer peripheral surface. Also, to facilitate entry of the head 60 into the recess 59, the mouth of the recess 59 and the inner edge portion of the sealing head 60 may have chamfers 66, 68.

Starting with the parts in the condition illustrated in Fig. 8, fitting 20A may readily be installed by slipping the nut 42 and the fitting body 56 over the end of the cable 21. The exposed conductors 25, 26 and the end of the cable sheath 24 are then introduced into the cable-receiving passage 61 of the sealing head 60 until the cable sheath 24 engages the threads 62. Upon turning of the head 60 in the proper direction, the threads 62, under the guidance of the unthreaded portion 64 of the passage 61, enter into axial threaded engagement with the cable sheath, such engagement being completed when the end of the sheath becomes about flush with the bottom of the sealing well 36. At this point, the sealing well 36 is filled with sealing compound 50 and the insulator assembly 28, 40 is applied in the manner set forth earlier herein.

The insulated conductors and sealing head 60 are then inserted into the tapped hole of the hub 55 and the fitting body 56 is then screwed into the hub 55. As such action progresses, the body 56 and the sealing head 60 rotate relatively and telescope together, the latter entering into the recess 59. When the body 56 has been fully threaded into the hub 55, the sealing head 60 should be approximately seated in the recess 59, any slight clearance being easily eliminated by a moderate outward pull on the cable 21. With the sealing head 60 seated in the recess 59, the sealing nut 42 may then be tightened (Figs. 6 and 10) to exert a radial squeeze on the sealing skirt 41 and complete a seal between the body 56 and the exterior of the cable sheath after the manner described in connection with the fitting 20.

In certain applications where only moderately moist atmospheres are encountered, as distinguished from applications where the fitting is immersed in water or other fluid, the self-cutting threads inside the fitting body and in biting engagement with the cable sheath may be relied upon, in conjunction with the sealing compound disposed in the sealing well, to exclude moisture from the cable and the junction box. Further, where the cable is not likely to be subjected to tensile forces tending to pull it from the fitting, the self-cutting threads in biting engagement with the cable sheath may also be relied upon to hold the cable rigidly in place.

I claim as my invention:

1. A fitting for tubular sheathed, mineral insulated cable and comprising, in combination, a hollow body having a longitudinal cable-receiving passage which is enlarged at one end to define a sealing head recess, a thin, annular sheath-engaging sealing skirt projecting axially from the opposite end of said body, a sealing head telescopically housed and relatively rotatable in the sealing head recess, said sealing head having a cable-receiving passage including self-cutting threads and an unthreaded portion, the latter being adjacent to and coaxial with the cable-receiving passage of said body, and means engageable with said body for deforming said sealing skirt into sealed engagement with the cable sheath and thereby locking said sealing head in place within said sealing head recess.

2. A fitting for application to tubular sheathed cable of the mineral insulated type and comprising, in combination, a hollow body having a sealing head recess adjacent one end thereof, a thin, annular sheath-engaging sealing skirt extending axially from the other end of said body and integral therewith, said body having a longitudinal cable-receiving passage extending between the sealing head recess and the sheath-engaging sealing skirt, a sealing head telescopically housed and relatively rotatable in the sealing head recess and having a sealing well therein, said sealing head having a cable-receiving passage communicating with said sealing well and including a portion having self-cutting threads and a portion which is unthreaded, the latter being adjacent to and coaxial with the cable-receiving passage of said body, a cap retainer skirt integral with said sealing head and surrounding the entrance to the sealing well therein, and means engageable with said body for squeezing said sealing skirt radially into sealed engagement with the cable sheath and thereby locking said sealing head in place within said sealing head recess.

3. A fitting for a cable of the type having a seamless metal sheath and a plurality of conductors spaced and insulated therein by mineral material, said fitting comprising in combination, an elongated fitting body, means in said body defining a longitudinal cable-size passage terminating at one end of the body in a sealing well, a plurality of self-cutting threads in said passage, said threads being of smaller internal diameter than said passage and being adjacent said sealing well and adapted to engage the end of the cable sheath for fixing the end of the cable within said passage with the plurality of conductors leading exposed from the end of the cable sheath out of the fitting via said sealing well, said sealing well being adapted to be filled with insulating-sealing material which insulates between and spaces the exposed conductors, an insulator assembly in said sealing well for anchoring the individual exposed conductors in place against lateral movement within the body, and including individual conductor-insulating sleeves bonded in and extending from the sealing well, and a sealing well cap seated in said sealing well and having spaced apertures for said insulating sleeves; the passage through said elongated fitting body having an unthreaded portion extending from the self-cutting threads to the other end of the body, nut-receiving threads on the exterior of said body at the said other end, a sealing nut engageable with said nut-receiving threads, an annular sealing device integral with said body and within said nut around the entrance to the body passage and engageable with cam means on the inside of said nut facing the fitting body for squeezing said sealing device radially into sealed engagement with the sheath on the cable as said nut advances on said nut-receiving threads, to secure the fitting body against movement on the cable, so that the cable sheath and the spaced conductors therein are locked in place at both ends of the passage in the fitting body, said nut having an inside cable-size region adjacent said cam means and a mouth facing away from the fitting body smoothy outwardly flaring from the cable size region, so as to permit the cable to be smoothly bent from the place inside the nut where it is anchored by the sealing device into the outwardly flaring mouth and region of emergence from said nut without rupture of the cable sheath.

References Cited in the file of this patent

UNITED STATES PATENTS

| | | |
|---|---|---|
| 447,775 | Higbee | Mar. 10, 1891 |
| 835,003 | Svensson | Nov. 6, 1906 |
| 1,121,386 | Means | Dec. 15, 1914 |
| 1,740,664 | Muehlberg | Dec. 24, 1929 |
| 1,809,582 | Church | June 9, 1931 |
| 1,927,390 | Church | Sept. 19, 1933 |
| 1,959,079 | Holt | May 15, 1934 |
| 2,125,570 | Ice | Aug. 2, 1938 |
| 2,211,856 | Kreidel | Aug. 20, 1940 |
| 2,276,969 | Heinichen | Mar. 17, 1942 |
| 2,331,409 | Markey | Oct. 12, 1943 |
| 2,466,057 | Somma | Apr. 5, 1949 |
| 2,509,341 | Goldsmith | May 30, 1950 |
| 2,580,818 | Mundy et al. | Jan. 1, 1952 |
| 2,672,500 | Bondon | Mar. 16, 1954 |
| 2,687,315 | Courtot | Aug. 24, 1954 |
| 2,701,147 | Summerville | Feb. 1, 1955 |

FOREIGN PATENTS

| | | |
|---|---|---|
| 349,549 | Great Britain | May 21, 1931 |
| 397,670 | Great Britain | Aug. 31, 1933 |
| 666,157 | Great Britain | Feb. 6, 1952 |